US007895328B2

(12) United States Patent
Eibach et al.

(10) Patent No.: US 7,895,328 B2
(45) Date of Patent: Feb. 22, 2011

(54) SYSTEM AND METHOD FOR CONTEXT-BASED SERIALIZATION OF MESSAGES IN A PARALLEL EXECUTION ENVIRONMENT

(75) Inventors: Wolfgang Eibach, Holzgerlingen (DE); Dietmar Kuebler, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 1518 days.

(21) Appl. No.: 10/685,160

(22) Filed: Oct. 14, 2003

(65) Prior Publication Data
US 2004/0117801 A1 Jun. 17, 2004

(30) Foreign Application Priority Data
Dec. 13, 2002 (EP) .................................. 02027972

(51) Int. Cl.
G06F 15/173 (2006.01)
(52) U.S. Cl. ........................ 709/226; 709/223; 709/224
(58) Field of Classification Search ................ 709/219, 709/220, 223, 224, 226
See application file for complete search history.

(56) References Cited

U.S. PATENT DOCUMENTS

| 6,009,275 | A | * | 12/1999 | DeKoning et al. | ........... 710/220 |
| 6,772,202 | B2 | * | 8/2004 | Wright | ....................... 709/219 |
| 6,816,904 | B1 | * | 11/2004 | Ludwig et al. | ............... 709/226 |
| 7,020,132 | B1 | * | 3/2006 | Narasimhan et al. | ......... 370/355 |
| 7,080,174 | B1 | * | 7/2006 | Thorsbakken et al. | ....... 710/112 |
| 7,103,803 | B2 | * | 9/2006 | Elez | ............................ 714/33 |

* cited by examiner

Primary Examiner—Hussein A Elchanti
(74) Attorney, Agent, or Firm—Scott Paul, Esq.; Carey Rodriguez Greenberg Paul, LLP

(57) ABSTRACT

A messaging system and method which allows parallel execution of related requests according their context-based sequence. A serialization processor receives each incoming message request from a messaging client, extracts a transaction identifier (TI), searches a state table for the TI, and, if the TI is found active in the state table, stores the request in a serialization queue and makes an entry for that TI with the state "queued" in the state table. After execution of the active request, its entry in the state table is cleared, and the queued request with the same TI is executed, whereupon its entry is changed from queued to active.

12 Claims, 9 Drawing Sheets

FIG. 5
Prior Art

| MQMD name | type | value |
|---|---|---|
| StrucId | MQCHAR4 | MQMD_STRUC_ID(Default) |
| Version | MQLONG | MQMD_VERSION_1(Default) |
| Report | MQLONG | tbd |
| MsgType | MQLONG | |
| Expiry | MQLONG | Default = UNLIMITED |
| Feedback | MQLONG | tbd |
| Encoding | MQLONG | native |
| CodedCharSetId | MQLONG | Same as queue manager (Default) |
| Format | MQCHAR8 | STRING |
| Priority | MQLONG | Specify a value between zero and 16. |
| Persistence | MQLONG | NOT_PERSISTENT |
| MsgId | MQBYTE24 | Generated by queue manager (default) |
| CorrelId | MQBYTE24 | NONE (default) |
| BackoutCount | MQLONG | Initial value = 0 |
| ReplyToQ | MQCHAR48 | Queue name for a reqply (none is default) |
| ReplyToQMgr | MQCHAR48 | Queue manager name for a reqply (none is default) |
| UserIdentifier | MQCHAR12 | userid of user which has logged on to the application (optional) |
| AccountingToken | MQBYTE32 | Set to hex 0. |
| ApplIdentityData | MQCHAR32 | Used for development purposes. |
| PutApplType | MQLONG | Set by Queue Manager (optional) |
| PutApplName | MQCHAR24 | Set by Queue Manager (optional) |
| PutDate | MQCHAR8 | Set by Queue Manager (optional) |
| PutTime | MQCHAR8 | Set by Queue Manager (optional) |
| ApplOriginData | MQCHAR4 | Set to blank by Queue Manager |

| Transaction Identifier 1 | Transaction State 1 | Message Identifier 1 | Time stamp |
| Transaction Identifier 2 | Transaction State 2 | Message Identifier 2 | Time stamp |
| Transaction Identifier n | Transaction State n | Message Identifier n | Time stamp |

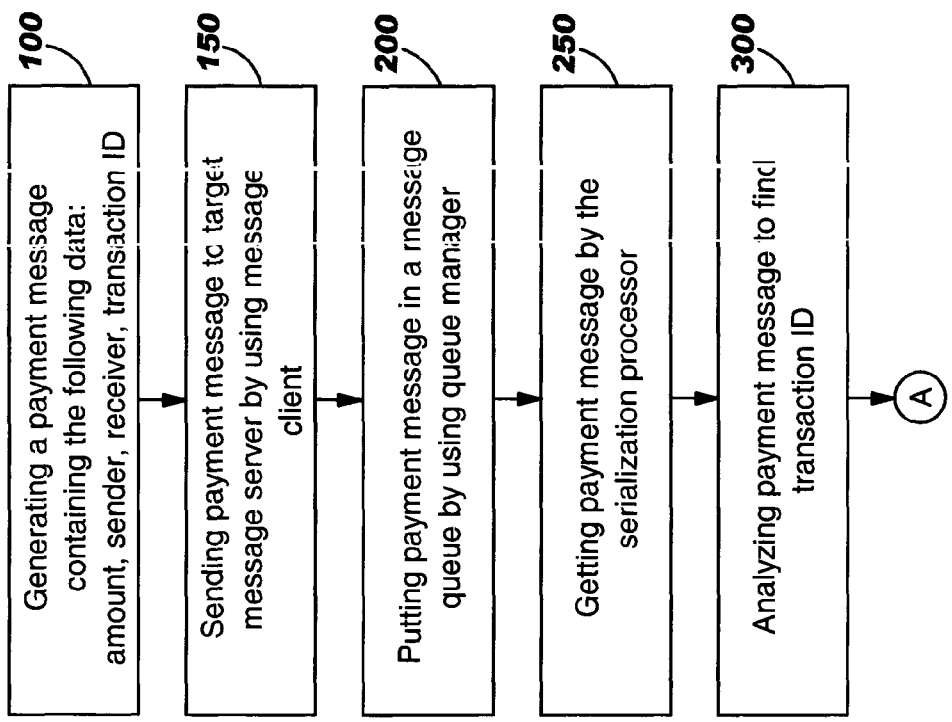
FIG. 8/1

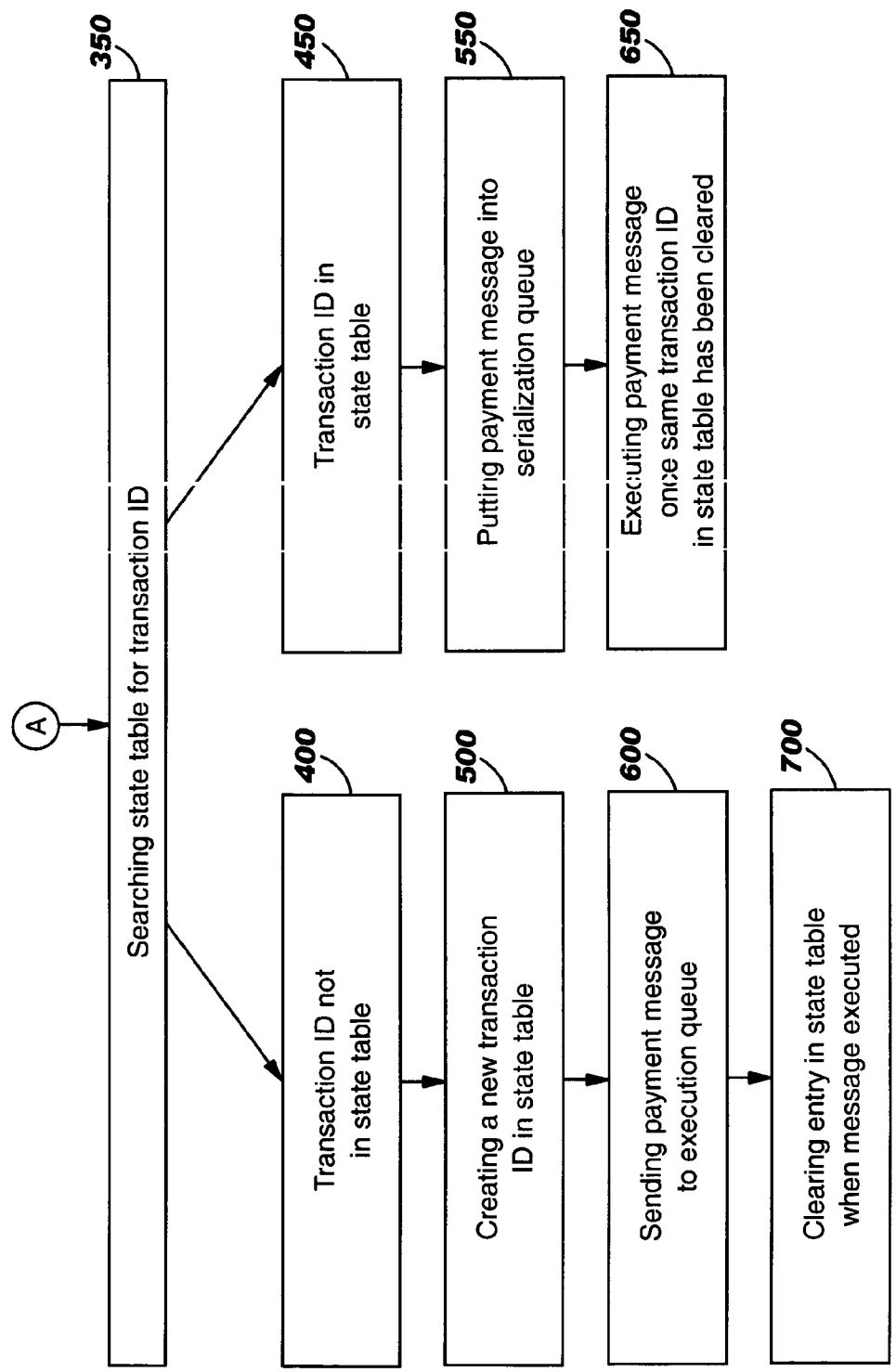
FIG. 8/2

SYSTEM AND METHOD FOR CONTEXT-BASED SERIALIZATION OF MESSAGES IN A PARALLEL EXECUTION ENVIRONMENT

FIELD OF THE INVENTION

The present invention relates generally to messaging, and more particularly relates to messaging in a parallel execution environment.

BACKGROUND

Messaging, as discussed here, may be defined as a method that allows two entities to communicate by sending and receiving messages without requiring human interaction. One of the most important aspects of messaging is its asynchronous nature: the sender of the message does not need to wait for the recipient to receive the information. Sending applications are free to generate messages at an appropriate speed, handling peak periods as they occur, without having to wait for recipients to deal with the requests.

Messaging methods vary in their implementations. Two of the most common implementations are the hub-and-spoke architecture and the bus architecture.

In the hub-and-spoke architecture, applications are connected to a central processor, which may be called a message server. The message server handles all communication among the connected applications, which are called the application clients. An application client can be a sender of a message, a recipient, or both.

The message server is responsible for routing messages correctly, authenticating and authorizing user access, and guaranteeing the delivery of messages.

A bus architecture does not have a centralized message server to coordinate the distribution of messages. Instead, each application client includes the functionality typically found in a message server. Application clients are connected to a message bus, which typically uses the network layer of the IP multicast protocol. Although the multicast network layer routes messages among each of the application clients, the clients must perform all checks and balances to ensure that the messages are delivered securely and reliably.

One of the major problems of today's messaging methods concerns the execution of related requests in a parallel execution environment. In FIG. 1, clients 10A-10N send messages to execution systems 17A and 17B through a message queue 14. For example, a client sends a payment message request to a bank. If the client sends another related request immediately following the payment request, e.g., to modify or cancel the payment request, the messaging method must always preserve the order of the original sequence of requests to guarantee a consistent execution. In a sequential execution environment there is no problem, since all requests are executed according to their original sequence.

In a parallel execution environment, however, e.g., an environment where the target system has two or more processors, preservation of the context-based sequence cannot be guaranteed. The parallel execution system starts a new thread for each incoming message request and executes requests without regard to their intended order. This may transpose the execution of two consecutive requests that are related. For example, a request to cancel a payment request may be executed before the payment request itself. Here, the request to cancel the payment request fails because there is nothing to cancel at the time the cancellation is executed, and the payment subsequently goes through despite its intended cancellation.

Existing messaging systems, for example the IBM MQ Series, do not provide any functionality for processing context-based requests in parallel execution environments without human interaction.

Thus, there is a need to provide an improved messaging system and method which is applicable in a parallel execution environment and which guarantees the automatic execution of related requests according their context-based or original sequence, without requiring human interaction.

SUMMARY

The present invention includes an improved messaging system and method which allows parallel execution of related requests according their context-based sequence by using a serialization processor. The serialization processor receives each incoming message request from the messaging client, retrieves a transaction identifier (TI), and checks a state table for the retrieved TI. When the TI is found already stored in the state table with the state "active," the serialization processor stores the new requests with the same TI in a serialization queue and makes an new entry for that TI with the state "queued" in the state table. Once an active request has been executed, its entry in the state table is cleared. The queued request with the same TI is executed by the execution system, and its entry is updated from the state "queued" to the state "active." In a preferred embodiment of the present invention, the headers of message requests may contain message identifiers (MI), which mark the message requests as context-based-serial. Message requests that do not have a message identifier are executed without involvement of the serialization processor.

These and additional features and advantages of the present invention will become more apparent from the detailed description set forth below when taken in conjunction with the drawings.

BRIEF DESCRIPTION OF THE DRAWINGS

The accompanying drawings illustrate embodiments of the present invention and, together with the description, further serve to explain the principles of the embodiments of the present invention.

FIG. 5 shows an example of a message header of the message system of the IBM MQ Series.

FIG. 7 shows a preferred structure of the state table as used by the inventive serialization processor.

FIG. 8 shows a flowchart illustrating steps of a method performed by the inventive serialization processor.

DETAILED DESCRIPTION

The following hardware and software provide a suitable context for implementation of the present invention: a messaging client installed at the client side, for example the IBM MQ Series Client; a network connection to the server system; and an operating system depending on the clients, for example Microsoft Window 2000 for PC-based clients. At the server side a messaging server is needed, for example the IBM MQ Series Server. A state table as proposed by the present invention may be implemented using a data base management system such as the IBM DB2. The server should have a multi-tasking operating system like Windows 2000.

Figure 3:
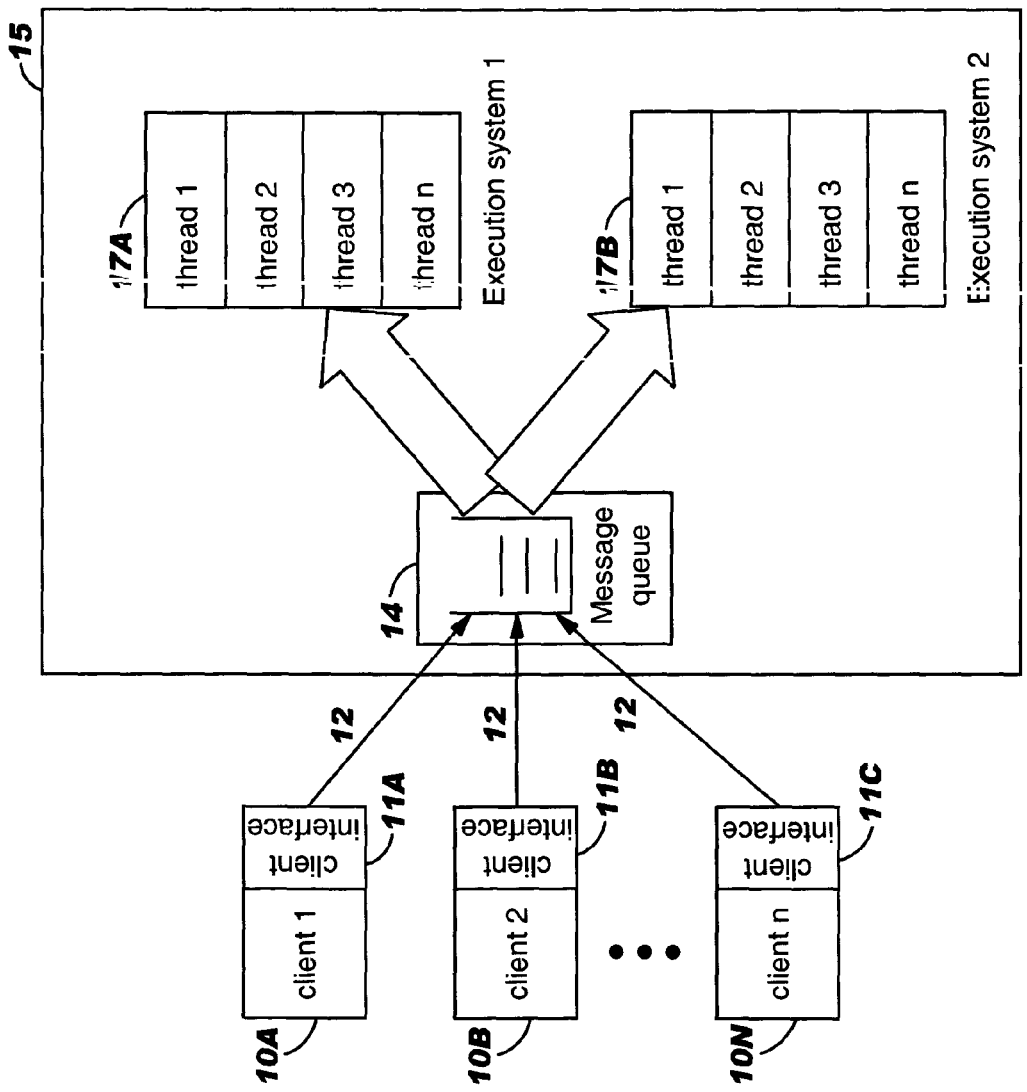
FIG. 3 shows a typical hub-and-spoke messaging system where multiple clients put their messages into a message queue.

As shown in FIG. 3, clients 10A-10N put their message requests 12 into a message queue 14 which is managed by a queue manager 15. If the message header of an incoming message defines that message as persistent, the message is then stored persistently; otherwise it is stored non-persistently. Non-persistent messages reside in the memory only, and may get lost if the queue manager 15 crashes. Persistent messages are stored on a persistent medium, for example a disk, and cannot be inadvertently lost. Each of the clients 10A-10N includes a client interface layer in order to communicate with the queue manager 15 at the server side.

The inventive serialization processor 16 gets each message 12 from the message queue 14, and analyzes the message to find the transaction identifier (TI) if the message context indicates that the message has a TI. The transaction identifier may be defined as an identifier in a message which identifies all messages belonging to the same business transaction. Then the serialization processor 16 searches a state table 18, which is preferably realized as a table in a database system. The state table 18 provides information regarding which messages are "queued" or "active" (being executed). The query returns two possible results: either the TI cannot be found in the state table 18, or the TI is found in the state table 18 with the state "active."

Figure 1:
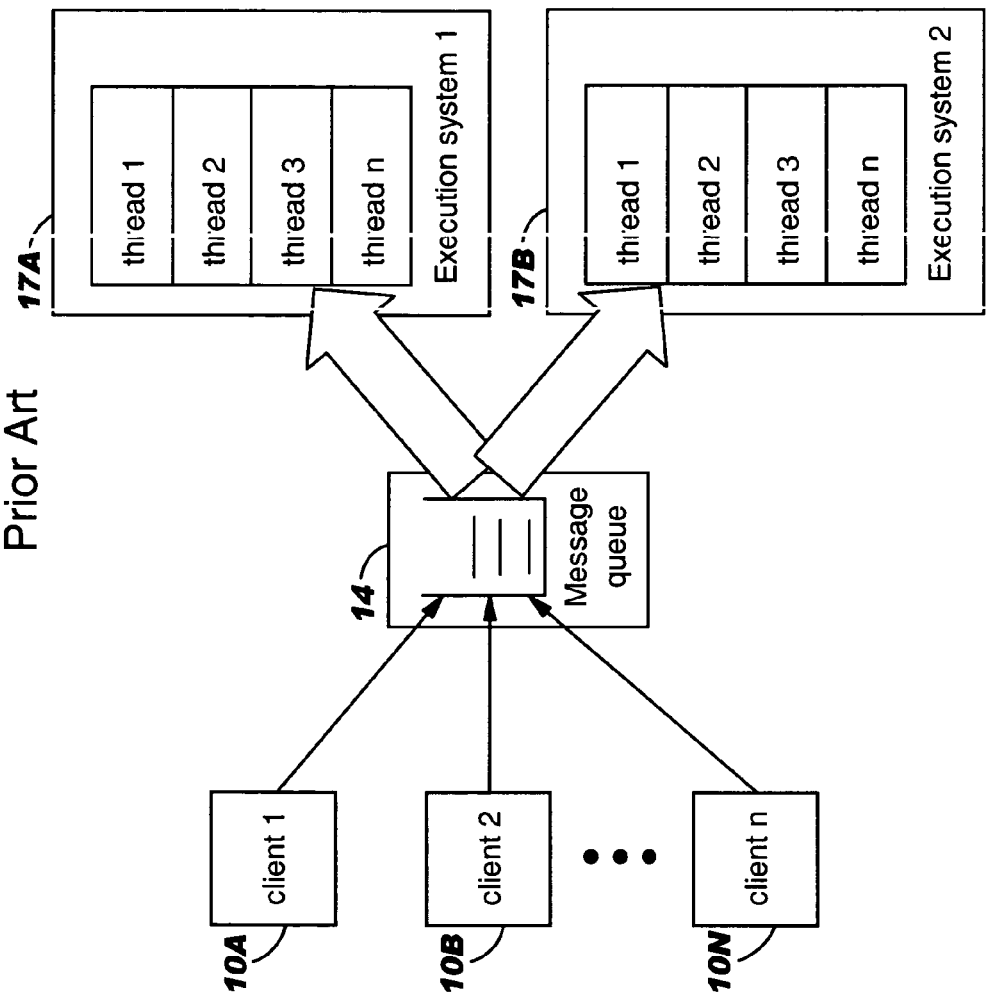
FIG. 1 shows an example of the messaging system having a parallel execution environment according to the prior art.
Figure 2:
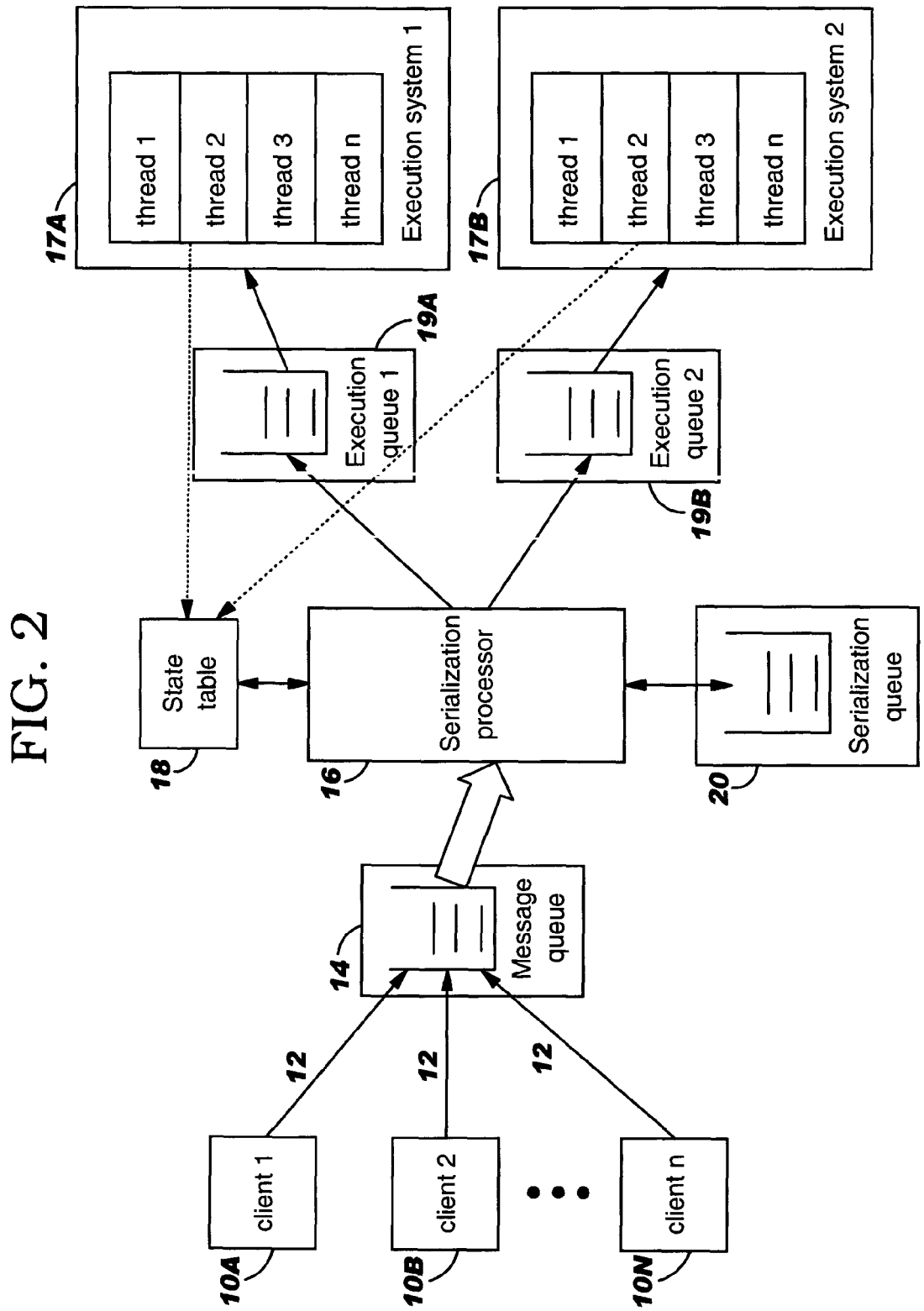
FIG. 2 shows incorporation of the present invention into a parallel execution environment.

When the TI cannot be found in the state table 18, the serialization processor 16 creates a new entry in the state table 18 that contains the new TI and the state "active." Then the scrialization processor 16 puts the message into one of the execution queues 19A, 19B shown in FIG. 2. The message is then executed by one of the threads of the connected execution system 17A, 17B. When the thread is finished processing but before it closes, the TI is cleared in the state table 18.

When the TI is found in the state table 18 with the state "active," the new message will be put into a serialization queue 20. In the serialization queue 20, the message is held until the active thread has finished and the TI has cleared in the state table 18. If a further message that has the same TI arrives at the message queue 14, the newly arrived message will be put into the serialization queue 20.

From time to time, the serialization processor 16 checks for messages held in the serialization queue 20. A number of different mechanisms may trigger this check in different embodiments. For example, a timer interrupt may cause the serialization processor 16 to check for messages in the serialization queue 20. In another embodiment, the executing thread may set a flag to inform the serialization processor 16 that it has finished its task and has cleared the TI in the state table 18. If the serialization processor 16 is triggered by such an event, it checks the serialization queue 20 for messages, and if a message is found, determines whether the TI has already been cleared from the state table 18. If the TI has been cleared, the message is removed from the serialization queue 20 and put into one of the execution queues 19A, 19B for processing.

The present invention may also be implemented as follows: When the transaction identifier is found in the state table 18 with the state "active," the new message may be put into the serialization queue 20, and a new entry created for that message in the state table 18 with the status "queued." After a defined time interval, the serialization processor 16 checks the state table 18, and changes the state to "active" once the related messages with the entry "active" have been cleared.

FIG. 3 shows a typical hub-and-spoke messaging system where multiple clients 10A-10N put their messages into a message queue 14. Each of the clients 10A-10N has a client interface 11A-11N with the queue manager 15. Furthermore, the inventive serialization processor 16 (which, in the interest of simplicity, is not shown in FIG. 3) has an interface with the queue manager 15 as well as with the application system. The serialization processor 16 ensures that an application thread is assigned to a message only when the serialization processor 16 puts the message into one of the execution queues 19A, 19B.

Figure 4:
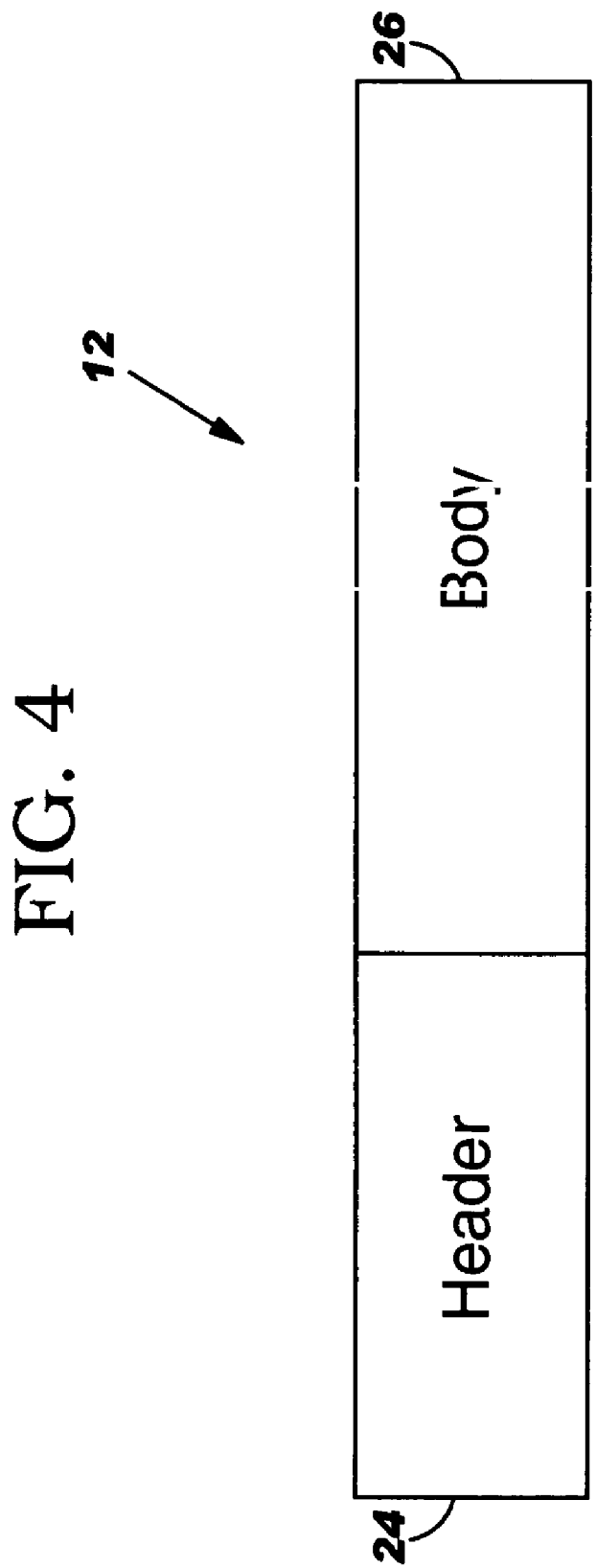
FIG. 4 shows a typical message suitable for use by the inventive serialization processor.

FIG. 4 shows a typical message layout suitable for use by the serialization processor 16. The message 12 includes a message header 24 and a message body 26. The message header 24 normally includes a message identifier, a source queue name, a target queue manager, the target queue name, the message type, and a code page used for the message body 26. Messages lacking a context-based identifier are treated as unrelated, and do not need to be executed by the serialization processor 16. The message body 26 normally contains the transaction identifier (TI) and the user (application) defined data.

The message body 26 is handled primarily by the execution or application system rather than the messaging system. Consequently, a traditional message system itself cannot react to a TI that is part of the message body 26. Therefore, the TI is inspected by the serialization processor 16 in order to avoid parallel execution for two messages which belong to the same TI. FIG. 5 shows an exemplary message header of the IBM MQ Series message system, which may be used by the present invention.

Figure 6:
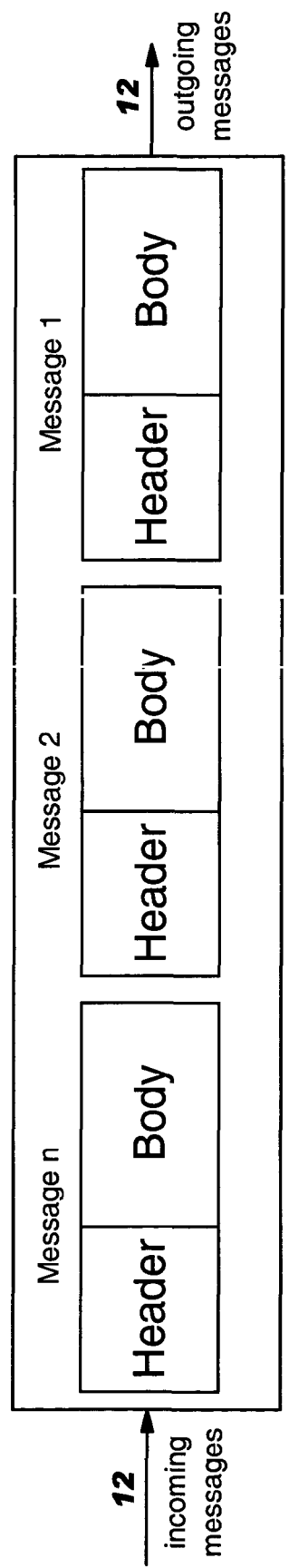
FIG. 6 shows a typical message queue layout suitable for use by the inventive serialization processor.

FIG. 6 shows preferred embodiment of the message queue 14 as used by the present invention. Messages are put into the message queue 14 by the clients 10A-10N. On the right-hand side of FIG. 6, the server side, messages are taken out by the serialization processor 16. In the inventive messaging system as described here, each message taken out of the message queue 14 creates a new application thread which handles the body of the message. There may be multiple server machines connected to the same queue, taking the messages in parallel.

FIG. 7 shows a preferred embodiment of the state table 18 as used by the present invention. Each incoming new message request contains a transaction identifier (TI) 28 in its message body. The serialization processor 16 checks the state table 18 to determine whether this transaction identifier 28 is already stored, and whether the transaction state 30 is active. If both conditions are satisfied, the transaction identifier 28, the state 30 "queued," and the message ID 33 taken from the message header 24 are stored in the state table 18 together with a time stamp 36 recording the arrival time of the new message. The state table 18 may preferably be implemented as a persistent table in a data base system, with columns for the transaction ID, message ID, and time stamp. This ensures that messages will not be lost.

If an incoming message request contains a TI which is not found in the state table 18, the new TI is stored in the state table 18 with the state 30 "active," together with its arrival time (time stamp 36) and the message ID 33 from the message header. Then the message is delivered to an application thread for processing. When the tread has completed its processing, the entry is cleared from the state table 18.

The possible transaction states 30 in the state table 18 are active and queued. The state "active" indicates that another message with the same TI is currently being processed by one of the application threads. The state "queued" indicates that another message with the same TI is already queued, and is waiting for processing, in which case the new message will also be queued.

The message ID 33 may also be stored in the state table 18, and is needed in order to retrieve the correct message from the serialization queue 20 when the processing of the active transaction is finished.

Furthermore, the time stamp 36 of the arrival time of the message is needed when more than one entry with the same TI is found in the state table 18. In this case, the saved messages must be put into the application queues according to the arrival sequence.

To ensure that requests are not lost, a logical unit of work (LUW) must span all activities necessary to process a message. A LUW will be started when a message is received from the message queue 14. Then, the data base holding the state table 18 is accessed to find the transaction identifier 28, after the message is put into one of the execution queues 19A, 19B. The state table 18 is updated to reflect the new transaction identifier 28. Then a commit operation must be issued which commits all activities. This guarantees that the present message is deleted from the message queue 14, that the message is available for processing in the execution queue 19A or 19B, and that the transaction identifier 28 is stored in the state table 18. The same transaction processing must be performed when a saved message is taken out of the serialization queue 20 and sent to one of the execution queues 19A, 19B for processing.

FIG. 8 shows a flowchart of a process according to the inventive method. The client application may be, for example, a payment application. The user creates a payment message which includes the following data: the amount of money to be paid, the sender, the receiver, and a transaction identifier. The payment application creates, using the message client, a payment message (step 100). The payment message contains a message header and message body as mentioned earlier with reference to FIG. 5. The payment message is sent to the message server by means of the message client and the network (step 150).

The message server receives the payment message and puts the payment message into the message queue 14 using the queue manager 15 (step 200). The queue manager 15 stores the payment message persistently or non-persistently, depending on the data in the message header. The serialization processor 16 takes the payment message from the message queue (step 250), analyses the payment message for the transaction identifier (step 300), and searches the state table 18 for the same transaction identifier (step 350).

If the transaction identifier is not already contained in the state table 18 (step 400), the serialization processor 16 creates a new entry in the state table 18 with the transaction identifier of the new message, its message ID, its time stamp, and its state "active" (step 500), and sends the payment request to the execution system for processing of the payment message (step 600). After the payment message is executed by the execution system or application, the entry in the state table 18 is cleared (step 700).

Otherwise (i.e., the transaction identifier is already stored in the state table 18) (step 450), the serialization processor 16 puts the new payment message into the serialization queue 20 (step 550) and, once the same transaction identifier has been cleared in the state table 18, the serialization processor 16 sends the payment message to the execution system for processing (step 650).

In another embodiment of the present invention, the new message is sent to the serialization queue 20, and a new entry for the new message is created in the state table 18 with the status "queued." After a defined time interval, the serialization processor 16 checks the state table 18 and changes the state "queued" to the state "active" once the related message with the entry "active" has been cleared.

We claim:

1. A method for context-based serialization of messages in a server system having a message queue and an execution system which performs parallel processing of messages, comprising the steps of:
    retrieving a message from the message queue;
    identifying a transaction identifier of the message;
    searching a state table for the transaction identifier;
    creating an entry for the message in the state table with the transaction identifier and a state of active upon the state table not containing the identified transaction identifier; and
    putting the message into an execution queue.

2. The method of claim 1, further comprising:
    checking states of messages in the state table at predetermined times; and
    upon a message with the transaction identifier has been cleared in the state table, putting a message from the serialization queue having the transaction identifier into the execution queue.

3. The method of claim 2, further comprising:
    recording, in the state table, a time stamp of a message arriving in the message queue; and
    putting the message into the execution queue in a sequence according the time stamp.

4. The method of claim 1, further comprising:
    upon the state table includes the transaction identifier with an active state, putting the message into a serialization queue;
    assigning a message ID to the transaction identifier in the state table; and
    retrieving the message from the serialization queue using the message ID.

5. The method of claim 1, further comprising:
    finding, within the state table, the transaction identifier with the state of active;
    entering a status of queued in the state table; and
    putting the message into a serialization queue.

6. The method of claim 1, wherein
    the state table comprises a transaction identifier and present state of a message, and
    the present state is selected as active or queued.

7. A computer hardware system for context-based serialization of messages, comprising:
    a server system having a message queue;
    a state table;
    an execution system which performs parallel processing of messages; and
    at least one processor, the at least one processor configured to:
        retrieve a message from the message queue;
        identify a transaction identifier of the message;
        search the state table for the transaction identifier;
        create an entry for the message in the state table with the transaction identifier and a state of active upon the state table not containing the identified transaction identifier; and
        put the message into an execution queue.

8. The computer hardware system of claim 7, wherein the at least one processor is further configured to:
   check states of messages in the state table at predetermined times; and
   upon a message with the transaction identifier has been cleared in the state table, put a message from the serialization queue having the transaction identifier into the execution queue.

9. The computer hardware system of claim 8, wherein the at least one processor is further configured to:
   record, in the state table, a time stamp of a message arriving in the message queue; and
   put the message into the execution queue in a sequence according the time stamp.

10. The computer hardware system of claim 7, wherein the at least one processor is further configured to:
   upon the state table includes the transaction identifier with an active state, put the message into a serialization queue;
   assign a message ID to the transaction identifier in the state table; and
   retrieve the message from the serialization queue using the message ID.

11. The computer hardware system of claim 7, wherein the at least one processor is further configured to:
   find, within the state table, the transaction identifier with the state of active;
   enter a status of queued in the state table; and
   put the message into a serialization queue.

12. The computer hardware system of claim 7, wherein
   the state table comprises a transaction identifier and present state of a message, and
   the present state is selected as active or queued.

* * * * *